United States Patent [19]

Kidoh et al.

[11] 4,317,861

[45] Mar. 2, 1982

[54] SYNTHETIC RESIN FOR USE AS ADHESIVE IN PREPARING COMPOSITE MATERIAL COMPRISING POLYVINYLIDENE FLUORIDE AND POLYVINYL CHLORIDE, SAID COMPOSITE AND METHODS FOR PREPARING SAID RESIN AND SAID COMPOSITE MATERIAL

[75] Inventors: Kunizoh Kidoh; Fujio Suzuki; Kazuo Kushida, all of Iwaki, Japan

[73] Assignee: Kureha Kagaku Kogyo Kabushiki Kaisha, Tokyo, Japan

[21] Appl. No.: 181,474

[22] Filed: Aug. 26, 1980

Related U.S. Application Data

[63] Continuation-in-part of Ser. No. 104,397, Dec. 17, 1979, abandoned.

[30] Foreign Application Priority Data

Dec. 27, 1978 [JP] Japan ................................ 53-161895

[51] Int. Cl.$^3$ ............................................. B32B 27/08
[52] U.S. Cl. .................................. 428/421; 428/518; 428/520; 525/276

[58] Field of Search ............... 428/520, 421, 518, 522; 525/276

[56] References Cited

U.S. PATENT DOCUMENTS

| | | | |
|---|---|---|---|
| 3,407,247 | 10/1968 | Reinhardt | 260/881 |
| 3,421,971 | 1/1969 | Kamal | 161/184 |
| 3,524,906 | 8/1970 | Schmitt et al. | 428/421 |
| 3,616,192 | 10/1971 | Sinclair | 161/184 |
| 3,709,776 | 1/1973 | Fuchs et al. | 428/421 |

FOREIGN PATENT DOCUMENTS 1176631 4/1959 France .
1605078 1/1973 France .

*Primary Examiner*—Carman J. Seccuro
*Attorney, Agent, or Firm*—Wegner & Bretschneider

[57] ABSTRACT

A synthetic resin for use in adhering polyvinylidene fluoride and polyvinyl chloride, the thus prepared composite material comprising polyvinylidene fluoride, the synthetic resin as an adhesive and polyvinyl chloride, and the methods for preparing the synthetic resin and the composite material are described as well as the composite material.

1 Claim, No Drawings

SYNTHETIC RESIN FOR USE AS ADHESIVE IN PREPARING COMPOSITE MATERIAL COMPRISING POLYVINYLIDENE FLUORIDE AND POLYVINYL CHLORIDE, SAID COMPOSITE AND METHODS FOR PREPARING SAID RESIN AND SAID COMPOSITE MATERIAL

CROSS-REFERENCE TO RELATED APPLICATION

The present application is a continuation-in-part of application Ser. No. 104,397, filed Dec. 17, 1979, now abandoned.

BACKGROUND AND DETAILED DESCRIPTION OF THE INVENTION

The present invention relates to a synthetic resin for use as an adhesive, and more particularly, relates to a graft copolymer for use as an adhesive in preparing a composite material comprising polyvinylidene fluoride and polyvinyl chloride sticked together with the adhesive, the thus prepared composite material and the methods for preparing the graft copolymer and the composite material.

Fluorocarbon resins are excellently resistant to chemicals, solvents and heat. Among all, vinylidene fluoride resins are not only excellent in processability and molding property but also show outstanding strength and toughness, and they are widely used as industrial materials such as corrosion resistant pipes, plates and sheets.

However, since articles comprising vinylidene fluoride resin are expensive, they cannot yet replace largely those articles such as lined with glass or made of corrosion resistant steels.

Lamination of inexpensive vinylchloride resins generally employed as pipes and plates with vinylidene fluoride resins, if possible, will make much contribution to the industrial field.

For laminating a vinylidene fluoride resin and a vinyl chloride resin, close adhesion between them is necessary. Specifically, an etching or anchoring effect between both of the resins or a compatability between both of the resins is required. The above-mentioned mechanical adhesion such as etching and anchoring cannot, however, be expected by known laminating means such as lamination or co-extrusion of both of such resins. There is no compatibility at all between the vinylidene fluoride resin and the vinyl chloride resin. Accordingly, an adhesive having a compatibility with both of these resins is necessary for enabling a good lamination in both of them.

Resins consisting essentially of polymethyl methacrylate have favorable compatibility with both of the above-mentioned resins and considered as good adhesives. However, they lack in the solvent resistance. If a composite material prepared by bonding a vinylidene fluoride resin and a vinyl chloride resin by the above-mentioned adhesive is exposed to an organic solvent vapour for a long time, the adhesive is attacked by a small amount of the solvent permeating through the layer of the vinylidene fluoride resin which is corrosion resistant and forms a liquid contact surface, to result in interlaminar peeling.

The inventors of the present invention have made studies on the development for an adhesive resin for use to stick vinylidene fluoride resins and vinyl chloride resins together and have found that a specified graft copolymer prepared, in principle, by grafting vinylidene fluoride to polymethyl methacrylate is effectively usable as the adhesive for preparing the composite material from vinylidene fluoride resin and vinyl chloride resin.

The graft copolymer according to the present invention contains 100 parts by weight of a main backbone chain comprising homopolymer or copolymer of methyl methacrylate and 30 to 500 parts by weight of a side chain comprising homopolymer or copolymer of vinylidene fluoride, and the graft copolymer shows a melt viscosity of $1 \times 10^2$ to $1 \times 10^6$ ps as measured by a Koka type flow tester under a load of 100 kg/cm$^2$ at a temperature of 220° C., and has a compatibility both with the vinylidene fluoride resins and the vinyl chloride resins and, further, it is excellently resistant to solvents, except for those polar solvents such as dimethylformamide, dimethylacetoamide and ketones which dissolve the vinylidene fluoride resins.

The above-mentioned graft copolymer having, in principle, sequences of methyl methacrylate units as its backbone and sequences of vinylidene fluoride units as its side chains can be produced by graft copolymerization of vinylidene fluoride to polymethyl methacrylate in any type of polymerization systems such as bulk-, emulsion- and suspension polymerization using a chemically or physically generated radical as the initiator. And in view of the grafting efficiency, the system of suspension polymerization affords a satisfactory grafting efficiency, the process of the suspension polymerization comprising the steps of dispersing a homopolymer or copolymer of methylmethacrylate into 1 to 10 times by volume of an aqueous medium, adding and dispersing vinylidene fluoride or a mixture of monomers containing more than 70% by weight of vinylidene fluoride and an oil-soluble catalyst selected from the group consisting of diisopropyl peroxydicarbonate and n-propyl peroxydicarbonate thereinto with the aid of a further added suspending agent such as methylcellulose and polyvinyl alcohol, and graft-copolymerizing the newly added monomer or monomer mixture at a temperature of 0° to 100° C., preferably 5° to 60° C., in an inert atmosphere, to polymethyl methacrylate. The progress of polymerization is observable by the reduction of the pressure of the system.

The polymethyl methacrylate for use in the present invention is homopolymer or copolymer of methyl methacrylate comprising at least 60% by weight of methyl methacrylate and acrylic or methacrylic ester with an alkyl group of 2 to 5 carbon atoms copolymerizable with methyl methacrylate. Polymethyl methacrylate obtained in a state of slurry by a suspension polymerization may be used as it is, or the coagulated product of the emulsion polymerization of methyl methacrylate may also be used.

The monomeric substance for use in grafting to the main backbone of polymethyl methacrylate comprises solely vinylidene fluoride, or at least 70% by weight of vinylidene fluoride and one or more monomers preferably selected from the group consisting of vinyl fluoride, tetrafluoroethylene, hexafluoropropylene or chlorotrifluoroethylene.

The weight ratio of the units of vinylidene fluoride as the side chain to the units of methyl methacrylate as the main backbone in the thus prepared graft copolymer is in a range of 30:100 to 500:100. In the case where the ratio is smaller than 30:100, the resistance to solvents of the product is deteriorated, and on the other hand, in the case where the ratio is larger than 500:100, the compatibility of the product with the vinyl chloride resin is greatly reduced. The molecular weight of the graft copolymer is controllable by adding a chain-transfer agent such as ethyl alcohol, propyl alcohol and acetone in advance in the monomer or monomeric mixture of vinylidene fluoride.

Vinylidene fluoride resin to be bonded with vinyl chloride resin by means of the graft co-polymer according to this invention is polymer or copolymer of vinylidene fluoride mainly composed of vinylidene fluoride, for example, a copolymer of vinylidene fluoride with vinyl fluoride, tetrafluoroethylene, hexafluoropropylene or chlorotrifluoroethylene.

Vinyl chloride resin is polymer or copolymer of vinyl chloride mainly composed of vinyl chloride and the resin may also contain impact modifiers, processing aids or other auxiliary agents and fillers.

The graft copolymer according to the present invention has a melt viscosity at 220° C. in the range, necessarily, between $1 \times 10^2$ and $1 \times 10^6$ ps, preferably, between $1 \times 10^3$ and $1 \times 10^5$ ps, under a load of 100 kg/cm$^2$ by Koka type flow tester. The graft copolymer of the melt viscosity within the above-mentioned range is thermoplastic and can be melted with ease into a film configuration. It can also be processed to be an intermediate layer between the layer of vinylidene fluoride resins and the layer of vinyl chloride resins to enable the adhesion. Lamination is also possible by way of such processes as coextrusion, for example, in-die lamination and out-of-die lamination. For use as the adhesive layer in the coextrusion, it is, however, preferable that the melting viscosity of the adhesive is between those of the vinylidene fluoride resins and the vinyl chloride resins as the basic material. No satisfactory results can be obtained if the melting viscosity of the graft copolymer is higher or lower than the range mentioned above.

In the thus obtained composite material by co-extrusion, both of the vinylidene fluoride resins and the vinyl chloride resins are bonded firmly to the layer of the graft copolymer to form a unique composite material in which no interlaminar peeling occurs even used as a corrosion resistant material for a long time in the presence of an organic solvent vapour.

EXAMPLE 1

A. Production of Basic Polymer

Into a 1000 ml stainless steel autoclave having a paddle type agitator, 700 ml of deionized water, 2.0 g of hydroxyapatite as a suspension stabilizer and 0.02 g of polyoxyethylene alkylether phosphate as an auxiliary suspension stabilizer were placed and the inner temperature was kept at 5°–10° C. Then, a mixture of 100 g of methyl methacrylate (MMA) and 2.4 g of diisopropyl peroxydicarbonate was charged in the autoclave and the gaseous space of the autoclave was sufficiently replaced with nitrogen. Thereafter, dispersion of the monomer was effected by stirring at 800 rpm for 30 minutes at 5° C. The temperature was thereafter raised to 40° C. and the polymerization was carried out for 3.5 hours at 40° C.

B. Graft Copolymerization

After the end of the polymerization of MMA in A, the temperature of the autoclave was lowered to 10° C., and then 100 g of vinylidene fluoride was introduced thereinto under pressure, and after dispersing the newly introduced monomeric vinylidene fluoride at 10° C. for 30 min, the inner temperature was raised to 45° C. to carry out the graft copolymerization for 24 hours. Meanwhile, the inner pressure showed a gradual reduction from the highest level of 55 kg/cm$^2$ to the final level of 20 kg/cm$^2$. After the graft copolymerization was over, the product was collected by filtration of the reaction product in the autoclave and washed with an aqueous solution of hydrochloric acid to remove polyoxyethylene alkylether phosphate. By further washing the product with water and then drying, 172.8 g of the graft copolymer was obtained as while beads-like particles. The yield of total polymerization (1) was thus 86.4%. The monomeric composition of the graft copolymer, that is, the weight ratio of vinylidene fluoride units to methyl methacrylate units in the graft copolymer, was 42.1:57.9.

It is to be noted that since the basic polymer produced by polymerization of methyl methacrylate was not isolated and directly used in the following graft copolymerization in the same autoclave, the yield of the polymerization for obtaining the basic polymer could not be found, and that the yield of polymerization which could be found was the yield of total polymerization represented by the following formula:

Yield of total polymerization (1)=the weight of the graft copolymer divided by the sum of the weight of monomer used for preparing the basic polymer, in this case, methyl methacrylate and the weight of monomer used for preparing the graft copolymer, in this case, vinylidene fluoride, and multiplied by 100, in percentage.

C. Calculation of grafting rate

In order to calculate the grafting rate in the thus conducted graft copolymerization, the graft copolymer was subjected to extraction with benzene in a Soxhlet extractor under reflux for 40 hours, and the benzene extract was obtained by distilling off the solvent from the liquid extract in an amount of 7.9 g corresponding to 4.6% of the graft copolymer.

The grafting rate of a monomer to a basic polymer is defined herein as the weight ratio of the part of the basic polymer, which has entered into graft copolymerization to the basic polymer before subjected to the graft copolymerization. Under the quite reasonable presumption that the part of the basic polymer, which has not entered into graft copolymerization is quite soluble in an organic solvent such as benzene and accordingly, the benzene extract of the basic polymer which has been subjected to the graft copolymerization mainly consists of the part of the basic polymer, which has not entered into the graft copolymerization in spite of having been subjected to the graft copolymerization, the above-mentioned grafting rate is represented and can be calculated by the following formula:

$$\text{Grafting rate} = \frac{\text{Weight of the basic polymer} - \text{Weight of BE*}}{\text{Weight of the basic polymer}}$$

Since the weight of the basic polymer could not be directly measured, as has been stated above, it was calculated indirectly from the weight of graft copolymer (a) and the weight ratio of methyl methacrylate units to vinylidene fluoride units in graft copolymer (b/c) as $$\left(a \times \frac{b}{b+c}\right),$$

in this case, $$\left(172.8 \times \frac{57.9}{57.9 + 42.1}\right) = 100.0 \text{ g}.$$

By using these data, the grafting rate was calculated to be as follows:

$$\text{Grafting rate} = \frac{100.0 - 7.9}{100.0} \times 100 = 92.1 \text{ (\%)}$$

The melt viscosity of the thus obtained graft copolymer was $6.8 \times 10^3$ ps under a 100 kg/cm² load at 220° C.

EXAMPLES 2 to 5

A series of polymerization and graft copolymerization were carried out in the same manner as in Example 1 while using various monomeric combinations in polymerization and in graft copolymerization shown also in Table 1 to obtain various graft copolymers shown in Table 1.

In addition, for the confirmation of the real occurrence of graft copolymerization, the same extracting procedures were carried out also on the sheet made by roll-blending of a mixture of PMMA and PVDF. In this case, the amount of extracted substance corresponded to the amount of PMMA used for preparing the sheet as is shown also in Table 1. When the results of extraction test carried out on the products of Examples 1 to 5 to the result of the polyblend of PMMA and PVDF, it is shown that the grafting rate of the graft copolymerization according to the present invention is satisfactorily high even when the composition of monomers was varied either in polymerization and/or in graft copolymerization.

of such a composite material were prepared by using the graft copolymers respectively obtained in Examples 1 and 3, and the properties of the thus prepared composite materials as follows:

A. Method for preparing the composite material

A laminate sheet was prepared by heat-pressing a combination of a layer of a polyvinylidene fluoride of 0.8 mm in thickness, a layer of the graft copolymer obtained in Example 1 or Example 3 and heat-pressed at 210° C. for 3 min under a pressure of 100 kg/cm² to be of 0.2 mm in thickness, and a layer of polyvinyl chloride of 6 mm in thickness, at a temperature of 210° C. for 4 min under a pressure of 100 kg/cm², the combined layers being piled in the above-mentioned order. As a comparative specimen, another laminate was also prepared by the same procedure except for using a layer of polymethyl methacrylate instead of the graft copolymer.

B. Corrosion resistant test on the composite material

In the case where the above-mentioned composite material, the laminate, is used as a corrosion-resistant material having a corrosion-resistant layer made of polyvinylidene fluoride as the contact surface against the corrosive substance such as benzene, the adhesive layer will be attacked by benzene permeating through the layer made of polyvinylidene fluoride resulting in the corrosion of the adhesive layer and then in the reduction of the bonding strength of the adhesive layer. The corrosion resistant was carried out in such a meaning by bringing the laminate prepared as above into contact to benzene or ethylene dichloride (EDC) for 3000 hours at a temperature of 50° C. with the layer of polyvinylidene fluoride in direct contact to the solvent.

C. Determination of bonding strength

The bonding strength of the layer of graft copolymer to the layer of polyvinylidene fluoride and the layer of polyvinyl chloride was measured by the following two methods on the laminate before and after subjecting the

TABLE 1

| Example | Monomer for[1] basic polymer (g) | | Monomer for[1] graft copolymer (g) | | Total yield (%) | Melt viscosity (ps)[+] | Composition of graft copolymer[++] | Benzene extract (%) | Grafting rate (%) |
|---|---|---|---|---|---|---|---|---|---|
| 1 | MMA | 100 | VDF | 100 | 86.4 | $6.8 \times 10^3$ | 42.1/57.9 | 4.6 | 92.1 |
| 2 | MMA | 100 | VDF/Cl-3F | 90/10 | 91.2 | $2.4 \times 10^3$ | 45.2/54.8 | 4.1 | 92.4 |
| 3 | MMA/MA | 70/30 | VDF/Cl-3F | 90/10 | 95.1 | $9.3 \times 10^2$ | 47.4/52.6 | 4.2 | 92.1 |
| 4 | MMA | 100 | VDF/6F | 85/15 | 82.5 | $3.3 \times 10^3$ | 39.4/60.6 | 7.5 | 87.6 |
| 5 | MMA/ST | 70/30 | VDF/Cl-3F | 95/5 | 86.0 | $2.7 \times 10^4$ | 41.9/58.1 | 8.0 | 86.2 |
| Polyblend of the same composition as Example 1 | PMMA | 100 | PVDF | 100 | — | — | 42.1/57.9 | 57.3 | 0 |

Notes:
[1]Monomers:
MMA means methyl methacrylate
MA means methyl acrylate
ST means styrene
VDF means vinylidene fluoride
Cl-3F means chlorotrifluoroethylene
6F means hexafluoropropylene
[+]The melt viscosity is measured with a Koka type flow tester, in which one gram of sample is charged in a cylinder of 10 mm inner diameter having a nozzle of 1 mm diameter at one end and then heated at a heating rate of 10° C./min. under a load of 100 kg/cm² to the temperature of 220° C.
[++]Weight ratio of grafted monomer to basic polymer.

EXAMPLE 6

In order to examine the performance of the graft copolymer according to the present invention as an adhesive of the composite material comprising vinylidene fluoride resin and vinyl chloride resin, specimens laminate to the corrosion resistant test with benzene or EDC, and the results are shown in Table 2:

(1) a method for measuring the peeling strength according to ASTM 1876/69, and (2) a method for measuring the tensile shear strength according to ASTM-D-1002/64.

As is seen in Table 2:

(1) In peeling strength test, the strength of the laminate prepared by using the graft copolymer according to the present invention as the adhesive layer was not altered by the corrosion test, whereas the strength of the laminate prepared by using polymethyl methacrylate was greatly reduced after the corrosion resistant test, the results showing the large corrosion resistance of the graft copolymer according to the present invention as the adhesive layer.

(2) In tensile shear strength test, before subjecting each specimen to the corrosion test, the basic material comprising solely the layer of polyvinylidene fluoride was broken at a shearing stress of 50 kg/cm² before any shearing occurrs. The same phenomenon was observed on the specimen prepared by using the graft copolymer according to the present invention and subjected to the corrosion resistance test. However, the comparative specimen of the laminate prepared by using polymethyl methacrylate once subjected to the corrosion resistance test showed shearing under the shearing stress of 7.4 kg/cm² after attacked by benzene or 3.6 kg/cm² after attacked by EDC without breaking of the basic material.

The above-mentioned fact informs that the graft copolymer was not deteriorated by the attack of either benzene or EDC during the corrosion resistance test, whereas polymethyl methacrylate was severely deteriorated (dissolved away by the solvent).

(b) a mixture of polymer of vinylidene fluoride and a benzotriazole-type ultra-violet ray absorber in a weight ratio of 100:15 by No. 2 extruder of 32 mm in diameter at a temperature of extrusion of 250° C., and (c) a graft copolymer of vinylidene fluoride to polymethyl methacrylate obtained in Example 1, which had been once pelletized at a temperature of 245° C., by No. 3 extruder of 25 mm in diameter at a temperature of extrusion of 200° C., and the thus extruded three polymers were immediately and in continuous manner supplied into a multi-manifold type T-die to extrude a three layered laminate. The extruded laminate was continuously brought into contact to the surface of a roll of 300 mm in diameter maintained at a surface temperature of 40° C. and was wound to be a roll of a three layered laminate via a roll as a surface temperature of 85° C.

The thus obtained three layered laminate was of 1 mm in the total thickness and had a thickness-composition of (b) 20 microns of the layer of polyvinylidene fluoride, (c) 20 microns of the adhesive layer comprising the graft copolymer, and (a) 960 microns of the layer of polyvinyl chloride.

COMPARATIVE EXAMPLE 1

A laminate was prepared in the same manner in Example 7 except for using a layer of polymethyl methacrylate instead of the graft copolymer of Example 1, and the adhesion strength of the laminate was compared to that of the laminate prepared in Example 7 before and after subjecting the laminates to the corrosion resistance test.

TABLE 2

| Resin of the adhesive layer | Peeling strength (kg/cm) | | Tensile shear strength (kg/cm²) | |
|---|---|---|---|---|
| | before corrosion | after resistance test | before corrosion | after resistance test |
| Graft copolymer obtained in Example 1 | 8.4 | 8.4 (benzene) 8.3 (EDC) | +breaking in basic material | breaking in basic material |
| Graft copolymer obtained in Example 3 | 8.4 | 7.8 (benzene) 8.3 (EDC) | breaking in basic material | breaking in basic material |
| Polymethyl methacrylate | 8.6 | 1.3 (benzene) 0.9 (EDC) | breaking in basic material | 7.4 (benzene) 3.6 (EDC) |

Note:
+The breaking occurred on all specimens at a shearing stress of 50 kg/cm² except for the specimen prepared by using polymethyl methacrylate obtained by collecting the polymer before adding monomeric vinylidene fluoride in Example 1.

EXAMPLE 7

A laminate (1) composed of a layer of vinylidene fluoride resin, a layer of the graft copolymer according to the present invention in Example 1 and a layer of vinyl chloride resin in the above-mentioned order was prepared for comparing its properties to those of another laminate (2) prepared in the following Comparative Example 1 by the same procedures as in Example 7 except for using a layer of polymethyl methacrylate instead of the layer of the graft copolymer of Example 1.

Preparation of the specimens of the laminate (1)

The following three components of the laminate (1) were respectively extruded by the three respective extruders under the respective conditions as follows:

(a) a polymer of vinyl chloride by No. 1 extruder of 90 mm in diameter at a temperature of extrusion of 180° C., Measurement of the adhesion strength of the laminates Half of the test pieces obtained from the thus prepared laminates (1) and (2) was subjected to the corrosion test by benzene described in Example 6, and then those test pieces not yet subjected to the corrosion test and those subjected to the corrosion test were subjected to the adhesion strength test following the test procedures described in Example 6.

The results of the adhesion strength (peeling strength) tests are shown in Table 3.

TABLE 3

| | Comparison of peeling strength | |
|---|---|---|
| | Peeling strength (kg/cm) | |
| Polymer as adhesive | before corrosion test | after corrosion test by benzene |
| Polymethyl methacrylate | breaking of the basic material* | 1.3 |
| Graft copolymer according | breaking of the | breaking of the |

TABLE 3-continued

| | Comparison of peeling strength | |
|---|---|---|
| | Peeling strength (kg/cm) | |
| Polymer as adhesive | before corrosion test | after corrosion test by benzene |
| to the present invention | basic material | basic material |

Note:
*Since the thickness of the layer of polyvinylidene fluoride was too small, the laminate itself was broken before the peeling occurs.

What is claimed is:

1. A corrosion resistant composite material of a laminate comprising at least a combination of a layer of vinylidene fluoride resin, a layer of a graft copolymer and a layer of vinyl chloride resin, said composite material being obtained by coextruding said polyvinylidene fluoride, said polyvinyl chloride and said graft copolymer of melt index of $1\times10^2$ to $1\times10^6$ ps as determined in a Koka-type flow tester at 220° C. under a load of 100 kg/cm$^2$ containing 30 to 500 parts by weight of side chains consisting of homo- or copolymer of vinylidene fluoride to 100 parts by weight of homo- or copolymer of methyl methacrylate as a main backbone chain, said graft copolymer being inserted between said polyvinylidene fluoride and said polyvinyl chloride within the die for the coextrusion to be used as said adhesive layer.

* * * * *